Patented Sept. 21, 1948

2,449,929

UNITED STATES PATENT OFFICE 2,449,929

ELASTOMER PLASTICIZING COMPOSITION COMPOSED OF COUMARONE RESIN AND AN AROMATIC HYDROCARBON OIL

Frank W. Corkery, Crafton, Pa., assignor to Pennsylvania Industrial Chemical Corporation, Clairton, Pa., a corporation of Pennsylvania No Drawing. Application February 26, 1944, Serial No. 524,071

6 Claims. (Cl. 260—33.6)

This invention relates to plasticizers for elastomers including those elastomers commonly known as synthetic rubbers, and for rubber. This is a continuation-in-part of my application Serial No. 479,227, filed March 15, 1943, now abandoned.

The term "elastomer" will be used herein to designate generically all synthetic rubbers and rubber-like plastics. There is literature authority for so-doing in the article "Synthetic rubber" by Fisher in the issue of Industrial and Engineering Chemistry for August 1939, vol. 31, No. 8, pages 941 to 945, inclusive, and in an article by Frederick Marchionna in the issue of Rubber Age for June 1942, vol. 51, No. 3, pages 209 to 211, inclusive. These authors concur in the desirability of establishing the term "elastomer" as embracing the elastoprenes or ringtype chloroprenes (such as "neoprene"), the elastolenes, such as butadiene polymers and copolymers, the elastothiomers, or organic polysulphides (such as "Thiokol," etc.), and the elastoplastics, such as high-polymer molding materials. My plasticizer may be used in conjunction with any of these elastomers; in that it couples tack-producing properties with high or relatively high solvent power in a non-volatile plasticizer having properties of general desirability as a plasticizer for elastomers, as well as in the peculiar utility which it derives by coupling high tack-producing properties with high solvent power.

The greatest utility of my plasticizer is, however, realized in plasticizing those synthetic rubbers composed of butadiene and styrene copolymers, the best known representative of which currently is the synthetic rubber known as "Buna S." That elastomer is much more readily worked than those synthetic rubbers composed of copolymers of butadiene and acrylic nitrile, such as the synthetic rubber bearing the trade name of "Perbunan," and has such solubility that it more readily forms compounds responding to an adequately low cold test. It is, however, notably lacking in adhesion, and that fact detracts greatly from its utility by inhibiting its use for certain purposes. It is not so soluble that soft resins may be used to plasticize it, and like the other elastomers commonly called synthetic rubber is substantially insoluble in aliphatic solvents. The usual resin solutions are lacking either in adequate solvent power or in adequate tack-producing properties satisfactorily to solve the problem.

It also is necessary in compounding natural and synthetic rubber, and the other materials falling under the generic designation "elastomer," that substances used either as plasticizers or as tack-increasing components are of moderate cost and are derived from such sources as to render them available in quantity.

The plasticizer of my invention is compounded from coumarone-indene resin, which is of itself a known plasticizing and tack-increasing agent in the compounding of natural rubber, together with a non-volatile plasticizing oil embracing at least some of the variants of the plasticizing oil disclosed in my companion application Serial No. 524,069, filed Feb. 26, 1944, of which application also the herein forms a continuation-in-part.

As discussed in my application to which reference has been made, it is necessary in order to obtain low cold test from a compound comprising synthetic rubber of the butadiene acrylic nitrile type, to render the length of time necessary for compounding reasonable, and to permit the mixing or compounding of the rubber in apparatus such as a Banbury mixer that the plasticizer have such high solvent power as to be a good solvent for holding the rubber, synthetic rubber, or other elastomer, in continuous phase and that it does so even at low temperatures. There is, however, a converse limiting requirement of the plasticizer. That requirement is that the plasticizer with respect to all its important ingredients have a boiling point sufficiently high to prevent it from creeping, or migrating to the surface of the elastomeric compound and gradually evaporating therefrom. Loss of the plasticizer as a whole, or any important ingredient of the plasticizer, leaves the compound with inadequate plasticizer to hold its high-molecular-weight, elastomeric content in continuous phase, so that it becomes hard and friable.

Correspondingly it is also necessary that in a blend of liquid solvent and resin the solution should have not only good tack-producing and high solvent properties, but also that its ingredient of higher solvent power and lower viscosity be non-volatile.

I have discovered that the high-solvent, liquid component of the plasticizer must of itself have an aniline point below 25 in order that it may be blended with coumarone-indene polymers higher than the dimers in any substantial proportion of the resin, to produce a tack-increasing blend of adequately high solvent power; and that the liquid plasticizer of my application referred to above, while responding to other requirements of a plasticizer for elastomers, is capable of forming plasticizers of relatively high solvent power when blended with a sufficient content of coumarone-indene resin including polymers of coumarone and indene higher than the dimers to give good tack when included in compounds of "Buna S" and other elastomers inherently deficient in that property. In accordance with my companion application above referred to, the desirable high-solvent, high-boiling oils may be described and discussed as follows:

Coumarone-indene dimer oil represents the lowest stage of polymerization of coumarone and indene. Coumarone and indene are constituents of the material known as coke oven light oil, which comes over before tar in the by-product coking of coal and which may be fractionated before or after purification into benzol, toluol, xylol, or light solvent naphtha, and heavy solvent naphtha which upon purification gives high-flash solvent naphtha. The light oil as it comes from the by-product oven is a vapor which is collected by counter-flow in a petroleum cut known as "wash oil," and from which "wash oil" it is recovered by distillation in what is known as "crude" stills. In order to purify this coke oven light oil, it is treated with sulphuric acid before fractionation, or its several fractions are individually purified by sulphuric acid treatment. In either case, the sulphuric acid treated material is neutralized and distilled in stills known as "pure" stills. In this distillation, there remains in the stills residues consisting largely of the dimers of coumarone and indene, together with higher coumarone-indene polymers and, as I have discovered, a substantial content of "dimolar" compounds, the whole being contaminated with sulphurized compounds of coumarone and indene grouped generically under the term "sulphonates."

The above described materials, as they are taken from the "pure" stills, have been used as plasticizers for natural rubber. For such use, their solvent power is not great, since they have an aniline point higher than that of pure coumarone and indene dimers, ranging fairly closely from about 31° C. to 34° C.

As a recent technical advance, processes have been invented and developed which convert the aliphatic or chain hydrocarbons into cyclic hydrocarbons, so that the aromatics benzol, toluol, and other cyclic products are obtained from petroleum oils. Processes of this general sort are disclosed in principle, and are illustrated by descriptions of specific exemplary operations in recent literature; as in the article "Catalytic dehydrogenation of monoolefins to diolefins" by Grosse, Morrell, and Marity, published in the March 1940 issue of Industrial and Engineering Chemistry, vol. 33, No. 3, pages 309 to 311, inclusive, and in the article "Catalytic cyclization of aliphatic hydrocarbons to aromatics" by Grosse, Morrell, and Mattox, published in the April 1940 issue of Industrial and Engineering Chemistry, vol. 33, No. 3, pages 528 to 530, inclusive.

With this knowledge of cyclization and dehydrogenation, it has become possible to build aromatics, unsaturated aromatics, conjugated unsaturated aromatics, diolefins, hydro-aromatic and unsaturated hydro-aromatic hydrocarbons from aliphatic hydrocarbon materials derived from petroleum. The processes may be based, with or without he use of catalysts such as heat, acid clays, fuller's earth, anhydrous acid salt, or metallic oxides and the like, on either petroleum aliphatics or mixtures of aliphatic and aromatic hydrocarbons. The literature on this new art is scant but rapidly developing. Complete information is not public knowledge at this time.

In at least some variant examples of those processes, a circulating body of petroleum oil is subjected to the cyclizing treatment comprising a vapor phase cracking to form a content of olefins and diolefins, with or without an insertion into the system of a content of aromatic hydrocarbons such as benzol, toluol, and like aromatics. Diolefins of the nature of butadiene and hexene, together with the cyclic compounds benzol, toluol, xylol, styrene, methyl-styrene, coumarone, indene, trimethyl-benzene, their isomers, and other cyclic compounds are taken off as the circulation proceeds. As removed at the end of the process or during its continuance, the recirculating oil is composed of "dimolar" compounds together with dimers and higher polymers of "light oil" unsaturates, and unpolymerized "light oil" unsaturates and saturates.

Recirculating oils rich in "dimolar" compounds remain at the end of various processes performed on petroleum oils and which involve cracking, reforming, dehydrogenating, and cyclizing. One type of recirculating oils are known commercially as "Resolve" oils recovered as by-products in processes for producing isoprene, butadiene, and styrene, as well as from processes in which benzol, toluol, isopropyl benzene, and the like are formed from aliphatics.

More particularly, the "Resolve" (recirculating solvent oils) oils to which I refer are those remaining from the catalytic cyclizing and dehydrogenation of aliphatic, and particularly olefinic hydrocarbons for producing conjugated unsaturated aromatics suitable for forming elastomers by polymerization. These oils recovered as by-products contain the longer chain "light oil" unsaturates such as coumarone, indene, methyl-styrene, and styrene, as well as saturate aromatics such as benzol, toluol, xylol, cumene, and trimethyl-benzene. Because of the dehydrogenating conditions under which they are produced, they are particularly rich in "di-molar" compounds formed from the aromatic saturates and unsaturates found in coke oven light oil. They also contain addition products of unsaturates such as indene, coumarone, and styrene with benzol, toluol, xylol, and high-flash solvent naphtha.

With the qualification that all the di-molecular substances which I have herein for convenience termed "dimolar" compounds are formed from compounds found in coke oven light oil, I may define them as compounds of the diphenyl series, and their alkyl and alkene substitution products, together with like substitution products of aliphatics. Explanation of that definition is desirable. Taking diphenyl initially, that substance consists of two benzene rings, joined with elimination of hydrogen. Diphenyl thus may be represented by the formula C₆H₅—C₆H₅, or structurally as follows:

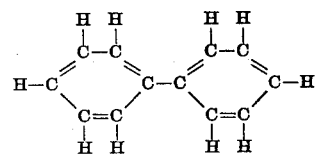

A similar arrangement is present in dibenzyl, which is two initial molecules of toluol C₆H₅.CH₃ linked with elimination of hydrogen in the manner structurally shown as:

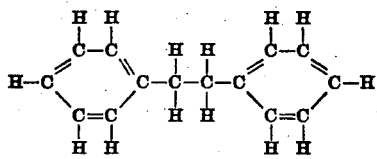

Dibenzyl thus may be considered as a phenyl substituted ethylene.

The same arrangement as in diphenyl is present in ditolyl, which is two initial molecules of toluol $C_6H_5.CH_3$ linked with elimination of hydrogen, as:

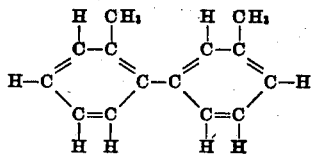

Other alkyl and alkene substitution products of diphenyl falling within the definition may be illustrated by the following structural formula, in which "R" is an alkyl or alkene substituted group:

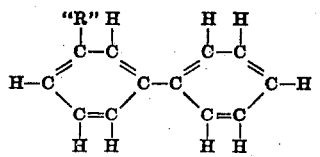

Taking phenyl styrene as illustrative of the alkene substituted products, its formula may be written structurally as follows:

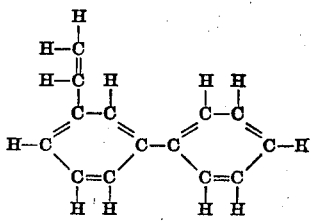

All of such compounds formed from the compounds found in coke oven light oil are found in recirculating oils from cyclizing processes and in the benzol, toluol, and xylol "pure" stills. Not all of them are usually present in any one of the designated high-boiling oils; but such oils all have a substantial content of at least one of the compounds of the group, and all the oils by virtue of a substantial content of such compound or compounds have a very low aniline point with respect to their relatively high boiling range. There are also formed and initially contained in these oils dimers of those unsaturates, together with some content of resins resulting from heat-polymerization and some content of unchanged cyclic aromatics such as benzol, toluol, xylol, high-flash solvent naphtha, coumarone, indene, and styrene.

The various phenyl compounds comprised in these oils all respond to the general formula:

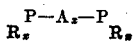

in which "P" is a phenyl group, "A" is an aliphatic group, "R" is an alkyl or alkene group, and the subscript "$x$" is a number from zero up. Considering the several specific compounds given above, it will be seen that each of them responds to this general formula.

As above noted, all the "Resolve" oils, from cyclizing processes are oils which are particularly high in "dimolar" (phenyl) compounds, consisting of the diphenyl series and its alkyl and alkene substitution products, phenyl-substituted aliphatics, and the like, formed from the saturates and unsaturates found in coke oven light oil. After removal of polymerizable unsaturates, chiefly represented by styrene, coumarone, and indene which would tend to render the oils unstable, together with unreacted saturates such as benzol, toluol, and xylol by distillation, and after removal by further distillation of heat-polymers higher than dimers, there is obtained an oil which boils within the approxiate range of 220° C. to 350° C. and over 90% within the range of 230° C. to 300° C., and which has an average aniline point of from about 20° C. to 22° C.

These last mentioned practices not only are relatively new, but in their details are not currently public knowledge. The above will, however, serve adequately to identify them.

It may be noted that in the recirculating oil there is seldom any remaining content of aliphatics boiling within the ranges of the "dimolar" compounds; and such content if present is not substantial, seldom exceeding 2% of the whole. Such oils consisting less than 5% of aliphatics may justifiably be considered as essentially aromatic oils.

Returning to the desirable properties of a plasticizer or non-evaporative solvent for synthetic rubbers and other elastomers, it should be borne in mind that below an aniline point of about 25° C., each degree of decrease in the aniline point of the plasticizer represents great improvement in the properties of the elastomer which is plasticized.

The aniline point of pure coumarone-indene dimers is about 26° C. to 27° C., and the aniline point of still residue from the sulphuric acid purification and neutralization of complete "light oil," purified of sulphonates and freed of resin polymers higher than dimers and entrapped low boiling aromatics, is about 25° C. That material, i. e. the purified and stripped whole "pure" still residue, has an aniline point lower than the aniline point of pure coumarone-indene dimers because of its content of "dimolar" compounds. It may be noted that a wholly satisfactory method of purifying "pure" still residue of sulphonates is to be found in United States patent to Samuel G. Burroughs No. 2,209,317.

It is a currently increasing practice to purify the benzol, toluol, and xylol fractions separately. The residues from the "pure" stills in which those fractions are distilled following sulphuric acid treatment and neutralization largely contain the "dimolar" compounds appropriate to the fraction, together with dimers of indene and coumarone, appropriate addition products of the sort above noted, and homologous products. After being purified of sulphonates, and freed both of resin polymers higher than the dimers of coumarone and indene and of their low boiling content, the still residues from the purification of benzol, toluol, and xylol all have aniline points below 25° C.

The purified aromatic oil from the xylol "pure" still residue has an aniline point of from 23° C. to 24° C.

The purified aromatic oil from the toluol "pure" still residue has an aniline point close to 22° C.

The purified aromatic oil from the benzol "pure" still residue has an aniline point close to 20° C.

The recirculating oils from cyclizing processes (freed of resin polymers higher than dimers and their low boiling content) have aniline points from 18° C. to 22° C.

All these variantly derived oils, like the oils from cyclizing processes, are aromatic oils formed of saturates and unsaturates found in coke oven light oil which boil over 200° C. They all boil within the approximate range of 200° C. to 350° C., and over 90% within the range of 230° C. to 300° C. It is to be understood that they all may be blended one with the other, to give such conjunction of convenience and averaged low aniline point as may be desirable under the circumstances. They may be enriched in their "dimolar" content for specific uses in which increased solvent power is indicated.

The sources of all these plasticizing oils are not only domestic but are also of such breadth as to give an abundant supply of the plasticizer to meet any reasonably anticipated demand. Increasing demands for benzol, and toluol as preferred yield from "light oil" lead to increased use of "pure" stills for purification of the benzol and toluol "light oil" fractions. Increasing use of synthetic rubbers of itself leads to increased production of recirculating solvent oils having the properties which I have found to render them so desirable as plasticizing oils for the butadiene-acrylic nitrile synthetic rubbers. The oils from none of these sources require complicated and expensive preparatory treatments in order to render them suitable for their intended use.

These "light oil" type plasticizing oils, whether they be derived as the recirculating oils from cyclizing and dehydrogenating processes or as still residues from the purification of benzol, toluol, and xylol fractions are similarly prepared for use. After a topping distillation, they are distilled carefully at as low a temperature as is possible in order to avoid cracking and in order to avoid carrying over any polymers higher than dimers. If the oils contain a substantial proportion of still reactive unsaturates, as occurs more frequently in the "Resolve" oils, they desirably are first subjected to heat-polymerization of those unsaturates and are then subjected to careful distillation.

As of the date of which I speak none of the oils disclosed herein are well known as to their composition or properties. The "Resolve" oils are in the nature of waste products, and prior to my inventions substantial use for them had not been found. The specific composition and properties of residues from the sulphuric acid purification of the benzol, toluol, and xylol "light oil" fractions had not been determined prior to my inventions, nor had there been exploration of uses to which the purified high-boiling residual oils from these fractions particularly are suited. In fact, where the purification of "light oil" fractions has been practiced it has been customary to run the still residues from all fractions into a common receptacle in which they mix as "pure" still residue.

It has been noted that whole "pure" still residue from the purification of coke oven light oil, i. e. "light oil," has an aniline point no lower than 25° C. This apparently is because the content of crude solvent naphtha in the light oil imparts to the still residue a high content of coumarone-indene dimers, which is not compensated by its content of aromatic "dimolars." In order that a substantial content of resin polymers, i. e. polymers higher than the dimers be included in a plasticizing blend for synthetic rubbers, it is necessary that the oil have an averaged aniline point below 25° C. It is, however, a currently increasing practice to purify the benzol, toluol, xylol and heavy naphtha (high-flash solvent naphtha) fractions of the light oil separately. The residues from the "pure" stills in which those fractions are distilled following sulphuric acid treatment and neutralization, contain the "dimolar" compounds appropriate to the fraction, together with coumarone and indene dimers, appropriate addition products of the sort above noted, and homologous products. After being purified of sulphonates, and freed of resin polymers higher than the dimers and of their low boiling content, these still residues from the purification of benzol, toluol, and xylol fractions all have aniline points below 25° C. Together with prepared recirculating oil from processes for producing conjugated unsaturates suitable for the production of elastomers, and kindred cyclizing processes, these still residues from the purification of "light oil" fractions are plasticizing oils capable of providing the high-solvent ingredient of a plasticizing blend containing a substantial quantity of solid coumarone-indene resin.

My plasticizing composition combining good tack-increasing properties with good solvent power, and which is a good plasticizer for "Buna S" synthetic rubber, is made by blending an example of the aromatic plasticizing oils boiling from about 220° C. to 350° C. and having an aniline point below 25° C. with coumarone-indene resin melting within the approximate range of 25° C. (ball and ring) and 120° C. (ball and ring). The proportions of oil to resin, aniline point of the oil, and melting point of the resin may be varied in accordance with the requirements of solvent power of the plasticizer presented by the high-polymer of the elastomer and the necessity for a tack-increasing component in the elastomeric compound which is made. In any case, however, certain relatively critical requirements as to solvent power must be met by the plasticizing composition. Thus I have discovered that in spite of desirable tack-increasing properties, a composition having an aniline point no lower than 30° C. is unsuitable for plasticizing butadiene-styrene synthetic rubber, or other elastomers belonging to any of the several classes above noted.

It should be explained that the tack-increasing properties and the solvent power of the coumarone-indene resin are inverse factors. Coumarone-indene dimers have fairly good solvent power, as is above noted. They do not, however, have good tack-increasing properties. With increased polymer size of the resin, its tack-increasing property is augmented but its solvent power is diminished. In order, therefore, that the aniline point of the blend be below 30° C., it is necessary if a high-melting coumarone-indene be included that the aromatic oil of the blend be of particularly low aniline point, that the high-melting coumarone-indene resin be included in lesser quantity, or that both such adjustments be made. With progressively lower melting point of the resin, its quantity may be increased or aromatic oil of lesser solvent power may be included while retaining the aniline point of the blend below 30° C.

I have discovered that a coumarone-indene resin which has a substantial content of coumarone-indene polymers higher than the dimer but which is composed chiefly of polymers, such as the dimers, trimers, tetramers, and pentamers so low that they do not precipitate from mineral spirits at temperatures higher than normal room temperature (75° F.) gives a preferred conjunction of tack-increasing properties and solvent power. Such resin may be included in the blend in relatively great proportion, to impart to it good tack-increasing properties, without raising the aniline point of the blend as high as 30° C.

It is therefore my practice to blend with the aromatic oils coumarine-indene resin of that sort, using aromatic oils having an aniline point below 25° C. and such relative proportion of the oil and the resin as to give a blend having in desired relative order conjoint tack-increasing properties and solvent power.

The following may be given as examples of tack-imparting blends which have high solvent power:

*Example No. 1*

A purified "pure" still residue of the sort above described was distilled to a point at which it was a solid coumarone-indene resin consisting substantially of the dimers, trimers, tetramers, pentamers, and hexamers of coumarone and indene. This coumarone-indene resin melting about 50° C. (ball and ring) was blended with an aromatic oil of the sort above described, boiling substantially above 200° C. and having an aniline point of about 22° C. in the proportion of 25% of the resin to 75% of the aromatic oil. The resultant blend had an aniline point of about 26° C.

*Example No. 2*

A coumarone-indene resin which was the product of polymerization with weak sulphuric acid catalyst and from which dimers had been partially distilled, consisting substantially of the dimers, trimers, tetramers, and pentamers of coumarone and indene, and having a melting point of about 45° C. (ball and ring) was blended with an aromatic oil of the sort above described, boiling substantially above 200° C. and having an aniline point of 22° C. The blend as made up consisted 25% of the coumarone-indene resin and 75% of the aromatic oil. The resultant blend had an aniline point of about 24° C.

*Example No. 3*

A coumarone-indene resin identical with that described in Example No. 2 consisting of dimers, trimers, tetramers, and pentamers of coumarone and indene and melting about 45° C. (ball and ring) was blended with an aromatic oil of the sort above described, boiling substantially above 200° C. and which had an aniline point of about 20° C. in the approximate proportion of 30% coumarone-indene resin and 70% of the aromatic oil. The resultant blend had an aniline point of about 22° C.

*Example No. 4*

A coumarone-indene resin identical with that described in Examples Nos. 2 and 3 consisting of dimers, trimers, tetramers, and pentamers of coumarone and indene and melting about 45° C. (ball and ring) was blended with an aromatic oil of the sort above described, boiling substantially above 200° C. and which had an aniline point of about 20° C. in the approximate proportion of 50% coumarone-indene resin and 50% of the aromatic oil. The resultant blend had an aniline point of about 26° C.

The above examples may be considered to provide data for making a plasticizing blend which couples tack-imparting properties, adequate for most grades of butadiene-styrene synthetic rubber, with relatively high solvent power. The blends exemplified are therefore of a sort which contributes to a rapid working of the stock. The relative proportions of the resin and the aromatic oil of high solvent power may be varied widely in the blend, in accordance with the considerations of high tackiness of the synthetic rubber, the importance of minimizing the time required adequately to work the synthetic rubber, the composition of the coumarone-indene resin, and the solvent power of the aromatic oil. The following example exemplifies a blend apportioned to provide higher tack-imparting properties, and the use of which requires a somewhat longer working of the rubber than do the blends exemplified above:

*Example No. 5*

A coumarone-indene resin composed of the dimers, trimers, tetramers, pentamers, and hexamers of coumarone and indene, and melting about 75° C. (ball and ring) was blended with an aromatic oil of the sort above described boiling substantially above 200° C. and which had an aniline point between 19° C. and 20° C. in the proportion of 60% of the coumarone-indene resin and 40% of the aromatic oil. The resultant blend had an aniline point of about 27° C.

Bearing in mind that the solvent power of the aromatic oil increases greatly with decrease in aniline point below about 21° C., it will be seen that many desirable blends may be made in which the relative proportions of the coumarone-indene resin and the aromatic oil are varied in both directions. Consistently with my invention it is requisite that the content of both will be substantial, in order to provide a plasticizing blend which couples good tack-imparting properties with an aniline point below 30° C. I have found that employing coumarone-indene resins within the approximate melting point range of 25° C. to 120° C. and the high-solvent-power, high-boiling aromatic oils having various aniline points below 25° C., blends adapted to particular materials and conditions may be made by blending the resin and the aromatic oils in substantial proportions of both. That is, each exemplification of the blend has such content of coumarone-indene resin that its quantity and quality is adequate to give the desired tack-imparting properties, and enough of the aromatic oil to give approximately solvent power so great as to be represented by an aniline point below 30° C.

Bearing in mind that my plasticizing blend is purposed primarily for use with butadiene-styrene synthetic rubber, I have found that for such purpose the resin and the aromatic oil may be blended in the approximate proportion of 20% to 80% of coumarone-indene resin melting within the approximate range of 25° C. to 120° C. and aromatic oils boiling within the approximate range of 220° C. to 350° C. and having aniline points below 25° C. In this blending regard is had to the factors given above as to apportionment with respect to the specific material to be plasticized and the desired rapidity at which the elastomer is to be worked. It may be noted that even the lowest melting coumarone-indene resin within the above specified melting point range has a large content of coumarone-indene polymers higher than the coumarone-indene dimers, which latter melt at about −70° C.

The plasticizing blend of my invention is not primarily purposed for use with the synthetic rubbers composed of butadiene and acrylic nitrile copolymers, which elastomer is best plasticized by an oil of exceptional solvent power such as the solvent oil disclosed in my co-pending application Serial No. 524,069, filed Feb. 26, 1944. In the event, however, that an exemplification of such synthetic rubber should be seriously deficient in the property of tack, an example of my blend having high solvent power may be used. For such purpose it is desirable to include in the blend a low-melting coumarone-indene resin in a quantity which is so substantial as to give the blend substantial tack-imparting properties, but which is below that given above as particularly suitable for plasticizing butadiene-styrene synthetic rubber.

In plasticizing natural rubber any exemplification of my blend which has an aniline point below 30° C. contributes to a rapid working of the rubber, and to a satisfactory incorporation of the plasticizer and other components of a rubber compound.

I have also used the plasticizing blend of my invention successfully to plasticize ring-type chloroprenes, of which "neoprene" is exemplary; the elastothiomers of which "Thiokol" is exemplary, and the elastoplastics, such as the high polymers and copolymers of vinyl esters and alcohols. In the case of the ring-type chloroprenes and the elastothiomers, any exemplification of the blend having an aniline point below 30° C. is satisfactory. In the case of the high-polymer molding materials, such as the copolymers of vinyl-chloride and vinyl-acetate, I have found the exemplifications of the blend having higher solvent power more suitable.

Since aniline point is made a determining factor in defining my invention and since methods of aniline point determination themselves vary, I shall gave the following procedure which is standardized and checks very closely in its determination, which procedure has been used in making all the aniline point determinations given above.

*Standard aniline point method*

In making an aniline point determination, I redistill purified aniline, rejecting the first 10% and the last 5% of the distillate. I have for use with this distilled aniline, petroleum naphtha of the grade known commercially as Stoddard solvent boiling chiefly between 150° C. and 200° C., which petroleum naphtha has previously been standardized against aniline by the method which follows to have an aniline point of 60° C. plus or minus 1° C.

In proceeding, I pipette 5 cc. of the material for determination into a French square bottle, and pipette 5 cc. of the Stoddard solvent having an aniline point of 60° C. into the same bottle. I stopper and shake the bottle. I then pipette 2½ cc. of the mixture into a 25 x 108 mm. test tube, and 5 cc. of the freshly distilled aniline is also pipetted into the same tube. The test tube is stoppered with a cork containing a thermometer of suitable range in such manner that the bulb of the thermometer extends centrally into the mixture in the test tube. This final mixture is warmed gently until complete miscibility is reached, and is then cooled at the rate of 2° C. per minute. An observation of the temperature at which the first sign of cloudiness appears in the mixture gives the aniline point for the material the aniline point of which is to be determined. I have found that this method is accurate within .2 of one degree centigrade.

Boiling ranges as given in the foregoing specification are all determined by straight distillation without the use of steam or vacuum. Where percentages are given without qualification, it is to be understood that they represent proportions based upon parts by weight. Where ranges are given without qualification, they are to be taken as "inclusive." Where melting point is given without qualification, it is to be taken as determined by the ball and ring method of softening point determination.

The above disclosure is to be taken as exemplifying my invention and not as restrictive thereof. Many changes may be made from the specific discussion of my specification without departing from the invention itself as sought to be disclosed and explained thereby.

I claim as my invention:

1. A plasticizing and tack-imparting blend for elastomers, composed of a tack-imparting content of coumarone-indene resin melting within the approximate range of 25° C. to 120° C., and an aromatic oil formed from other compounds found in coke oven light oil and boiling within the approximate range of 220° C. to 350° C. which has an aniline point below 25° C. by virtue of a substantial content of at least one compound of the group responding to the formula

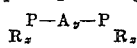

in which "P" is a phenyl group, "A" is an aliphatic group, "R" is selected from the group consisting of alkyl and alkenyl groups, "$x$" is a number up to unity and "$y$" is a number up to unity, in the blend the said aromatic oil being in a quantity adequate to give the blend an aniline point below 30° C.

2. A plasticizing and tack-imparting blend for elastomers, composed of a tack-imparting content of coumarone-indene resin and an aromatic oil formed from the compounds found in coke oven light oil and boiling within the approximate range of 220° C. to 350° C. which has an aniline point below 25° C. by virtue of a substantial content of at least one compound of the group responding to the formula

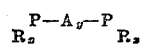

in which "P" is a phenyl group, "A" is an aliphatic group, "R" is selected from the group consisting of alkyl and alkenyl groups, "$x$" is a number up to unity and "$y$" is a number up to unity, the said coumarone-indene resin having a substantial content of polymers higher than the coumarone-indene dimers and being composed chiefly of polymers soluble in mineral spirits at temperatures above 75° F., in the blend the said aromatic oil being in a quantity adequate to give the blend an aniline point below 30° C.

3. A plasticizing and tack-imparting blend for elastomers, having an aniline point below 30° C., which blend is composed 20% to 80% of an aromatic oil formed from the compounds found in coke oven light oil and boiling within the approximate range of 220° C. to 350° C. which has an aniline point below 25° C. by virtue of a substantial content of at least one compound of the group responding to the formula

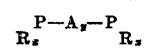

in which "P" is a phenyl group, "A" is an aliphatic group, "R" is selected from the group consisting of alkyl and alkenyl groups, "$x$" is a number up to unity and "$y$" is a number up to unity, and 20% to 80% of coumarone-indene resin having a melting point within the approximate range of 25° C. to 120° C.

4. A plasticizing and tack-imparting blend for elastomers, having an aniline point below 30° C., which blend is composed 20% to 80% of an aromatic oil formed from the compounds found in coke oven light oil and boiling within the approximate range of 220° C. to 350° C. which has an aniline point below 25° C. by virtue of a substantial content of at least one compound of the group responding to the formula

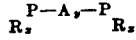

in which "P" is a phenyl group, "A" is an aliphatic group, "R" is selected from the group consisting of alkyl and alkenyl groups, "$x$" is a number up to unity and "$y$" is a number up to unity, and 20% to 80% of coumarone-indene resin which has a substantial content of coumarone-indene polymers higher than the coumarone-indene dimers and is composed chiefly of polymers which show no substantial precipitation from mineral spirits at temperatures above 75° F.

5. A plasticizing and tack-imparting blend for elastomers, having an aniline point below 30° C., which blend is composed 20% to 80% of an aromatic oil formed from the compounds found in coke oven light oil and boiling within the approximate range of 220° C. to 350° C. which has an aniline point below 22° C. by virtue of a substantial content of at least one compound of the group responding to the formula

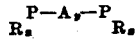

in which "P" is a phenyl group, "A" is an aliphatic group, "R" is selected from the group consisting of alkyl and alkenyl groups, "$x$" is a number up to unity and "$y$" is a number up to unity, and 20% to 80% of coumarone-indene resin having a melting point within the approximate range of 25° C. to 120° C.

6. A plasticizing and tack-imparting blend for elastomers, having an aniline point below 30° C., which blend is composed 20% to 80% of an aromatic oil formed from the compounds found in coke oven light oil and boiling within the approximate range of 220° C. to 350° C. which has an aniline point below 22° C. by virtue of a substantial content of at least one compound of the group responding to the formula

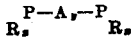

in which "P" is a phenyl group, "A" is an aliphatic group, "R" is selected from the group consisting of alkyl and alkenyl groups, "$x$" is a number up to unity and "$y$" is a number up to unity, and 20% to 80% of coumarone-indene resin which has a substantial content of coumarone-indene polymers higher than the coumarone-indene dimers and is composed chiefly of polymers which show no substantial precipitation from mineral spirits at temperatures above 75° F.

FRANK W. CORKERY.

REFERENCES CITED

The following references are of record in the file of this patent:

UNITED STATES PATENTS

| Number | Name | Date |
|---|---|---|
| 2,006,310 | Cowdery | June 25, 1935 |
| 2,095,630 | Cowdery | Oct. 12, 1937 |
| 2,285,562 | Britton et al. | June 9, 1942 |